(12) United States Patent
Fontijn

(10) Patent No.: US 6,868,429 B2
(45) Date of Patent: Mar. 15, 2005

(54) METHOD OF IMPLICIT PARTITIONING THE STORAGE SPACE AVAILABLE ON A STORAGE MEDIUM

(75) Inventor: Wilhelmus Franciscus Johannes Fontijn, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 84 days.

(21) Appl. No.: 09/877,313

(22) Filed: Jun. 8, 2001

(65) Prior Publication Data

US 2002/0007366 A1 Jan. 17, 2002

(30) Foreign Application Priority Data

Jun. 9, 2000 (EP) .......................................... 00202040

(51) Int. Cl.⁷ .............................................. G06F 17/30
(52) U.S. Cl. ..................................... 707/205; 711/100
(58) Field of Search ........................... 707/205; 711/100

(56) References Cited

U.S. PATENT DOCUMENTS

| | | | | |
|---|---|---|---|---|
| 5,018,060 A | * | 5/1991 | Gelb et al. | 707/205 |
| 5,210,844 A | * | 5/1993 | Shimura et al. | 711/153 |
| 5,388,016 A | * | 2/1995 | Kanai et al. | 360/72.1 |
| 5,475,834 A | * | 12/1995 | Anglin et al. | 707/203 |
| 5,546,557 A | * | 8/1996 | Allen et al. | 711/111 |
| 5,706,472 A | | 1/1998 | Ruff et al. | 395/497.04 |
| 5,758,050 A | * | 5/1998 | Brady et al. | 714/1 |
| 5,758,360 A | * | 5/1998 | Zbikowski et al. | 707/205 |
| 5,787,446 A | * | 7/1998 | Dang et al. | 707/205 |
| 5,909,540 A | * | 6/1999 | Carter et al. | 714/4 |
| 6,047,280 A | * | 4/2000 | Ashby et al. | 707/2 |
| 6,128,623 A | * | 10/2000 | Mattis et al. | 707/103 R |
| 6,173,291 B1 | * | 1/2001 | Jenevein | 707/200 |
| 6,272,611 B1 | * | 8/2001 | Wu | 711/173 |
| 6,321,358 B1 | * | 11/2001 | Anderson | 714/763 |
| 6,327,594 B1 | * | 12/2001 | Van Huben et al. | 707/200 |
| 6,487,547 B1 | * | 11/2002 | Ellison et al. | 707/2 |
| 2002/0059539 A1 | * | 5/2002 | Anderson | 714/6 |

FOREIGN PATENT DOCUMENTS

| | | | | |
|---|---|---|---|---|
| EP | 0628906 A2 | 12/1994 | | G06F/3/06 |
| EP | 0795862 A2 | 9/1997 | | G11B/20/12 |

OTHER PUBLICATIONS

Patent Abstracts of Japan, Kugimiya Toshiaki, "Divided Area Relocation System For Storage Device," Publication No., 08314773, Nov. 29, 1996, Application No. 07115561, May 15, 1995.

* cited by examiner

*Primary Examiner*—Wayne Amsbury
(74) *Attorney, Agent, or Firm*—Michael E. Belk

(57) ABSTRACT

A method and apparatus for implicitly partitioning the storage space available on a storage medium, to a storage medium for storing user data and to a recording device for storing user data on a storage medium. In order to limit the mount/unmount time of a volume like a UDF volume on a magnetic tape for ADR and to limit overall seek times during reading:

Figure 1:
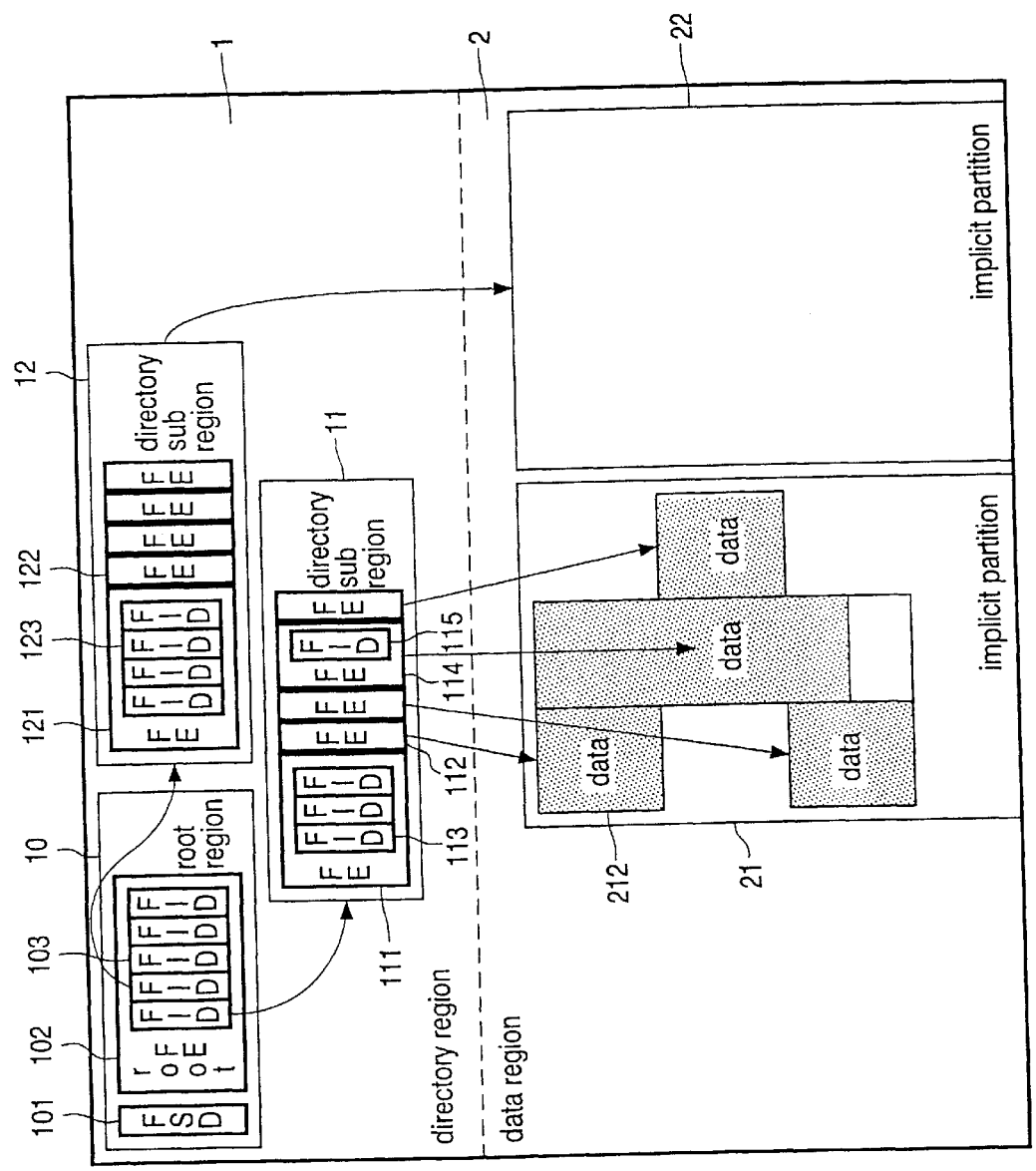

a) storage space available for storage on the medium is divided into a directory region and a data region,
b) metadata are stored in the directory region,
c) user data are stored in the data region being implicitly subdivided into data sub-regions,
d) file set data for user data stored in a data sub-region are stored in a corresponding directory sub-region being assigned to this data sub-region, and
e) borders and size of data sub-regions are variable.

19 Claims, 7 Drawing Sheets

METHOD OF IMPLICIT PARTITIONING THE STORAGE SPACE AVAILABLE ON A STORAGE MEDIUM

The invention relates to a method for implicitly partitioning the storage space available on a storage medium, a storage medium for storing user data and a recording device for storing user data on a storage medium.

According to the Universal Disk Format standard (UDF standard) as it is described in the UDF specification, revision 2.00, Optical Storage Technology Association (OSTA), 1998, the file system maintains volume and directory information, also known as metadata, in descriptors. Most of these descriptors are stored in a separate logical sector. The logical sector size being, by definition, the smallest unit of data addressable by the software layer.

The main problem area addressed by the invention being directory information in random order, scattered across the medium.

This leads to extensive seek overhead if the medium is large and/or seeks are relatively slow. Hence, with the increasing size of UDF volumes and the implementation of UDF on devices with relatively long seek times or large physical sectors, the management of the directory information becomes even more critical.

It is therefore an object of the invention to provide a method of partitioning the storage space available on a storage medium and a method for storing user data on a storage medium where the above mentioned problems are overcome, in particular where the (un)mount time of a volume and the overall seek times during reading are limited. Further, a corresponding storage medium and a corresponding recording device shall be provided.

A solution to this object is achieved by a method of implicitly partitioning the storage space available on a storage medium as claimed in claim 1 and by a method of storing user data on a storage medium as claimed in claim 7. Further, a solution is presented by the storage medium as claimed in claim 8 and a recording device as claimed in claim 11.

The general idea of the invention is to concentrate data that have to be stored on the medium in certain regions instead of scattering the data all over the medium. All metadata, i. e. volume, directory and other file system data, are concentrated in a region called directory region, which is not by definition a UDF partition and which is also not necessarily a contiguous part of the medium. User data are concentrated in a data region which is implicitly subdivided into one or more data sub-regions which are also called implicit partitions. "Implicit" in this respect means that the boundaries of these partitions are not defined explicitly, i. e. the shape, boarders and size of these data sub-regions are not prescribed but can be changed dynamically. These data sub-regions may also overlap and may not cover all available space. Further, for each data sub-region a separate directory sub-region is provided, either in the directory region or in the data region. These directory subregions contain all file system data for the files contained in the corresponding data sub-region.

The shape and size of the data sub-regions are not prescribed, which leaves the choice to the implementation to fit the intended purpose. The methods to determine the number of directory sub-regions include:

predefined (e. g. depending on the capacity of the medium), user defined during medium initialization (e. g. depending on the anticipated use such as hard disk backup, multimedia files storage), use defined during actual use.

Preferably, in the directory region there is provided a root region for storing general data of the medium, i. e. which contains all general information on the volume as well as the root structures. This root region contain those sectors that are intended to be the first to be read by the file system. This region should therefore be allocated on a recognizable, easily accessible location to enable speedy recovery of the information. This region does not necessarily include the first sectors accessed by the device. The latter sectors may lie outside the area covered by the file system, the logical address space.

According to advantageous aspects of the invention as recited in dependent claims there are two allocations allowed for the directory sub-regions:

sequentially after the root region, e. g. to read these regions directly after reading the root region, or sequentially within the corresponding data sub-region, resulting in a fragmentation of the directory region but not the subdirectory regions themselves.

If and how fixed space will be allocated for directory sub-regions will be left to the implementation. Directory information shall be placed as much as possible contiguously within a directory sub-region. In any case, this metadata should be stored in such a way that the directory information can be read and written one directory sub-region at a time. A special case, for example is where exactly one subdirectory is defined in the root region for each data sub-region.

In principle no file data is allowed in the directory region, however, the option to place "lateral" data within the directory region is not explicitly excluded. This will be only permitted to metadata not belonging to the UDF file system and not recognized as UDF file data. The "lateral" data file shall be small and hidden from the user.

The physical boundaries of the implicit partitions will not be predefined. According to an advantageous further development the implicit partitions gain shape by the grouping of the file entries (FE's) of files with allocation extents inside the data sub-regions. These file entries will be grouped into the directory sub-region that corresponds to that data sub-region. Neither shape nor size nor physical mapping of the data sub-regions is formally set. There is no rule to enforce the borders of data sub-regions. There is no predefined allocation strategy to be enforced within data sub-regions. An implementation has complete freedom to mould the data sub-regions thus that the aim of the implementation is optimally served. Furthermore, the chosen form for a data sub-region is, in principal, dynamic, which means that the form is only fixed if chosen to be thus.

A main advantage of this structure is that the root of a volume can be mounted very efficiently and therefore fast. Furthermore, it is made easy to read only that part of the directory information that is really needed, for instance, to honor a user request. In addition, implicit partitioning facilitates that only that part of the directory information is updated that has actually changed. In certain cases the latter reduces unmount times considerably. Using implicit partitioning a policy of clustering related files can be maintained for higher levels of utilization of the medium, even if non-related files are stored in the meantime. This resistance to data fragmentation optimizes read actions. The result is the most interactive access possible for a medium with massive storage capacity and/or relatively poor seek times, while remaining compliant to the UDF standard.

It shall, however, be understood that the invention is not restricted to methods and mediums being compliant to the UDF standard. The invention is also not restricted to optical storage mediums like CDs (e. g. CD-R or CD-RW) or DVDs but can also be applied to other storage mediums like magnetic tapes for Advanced Digital Recording (ADR) or fixed disks, and especially to random access storage mediums.

Figure 2:
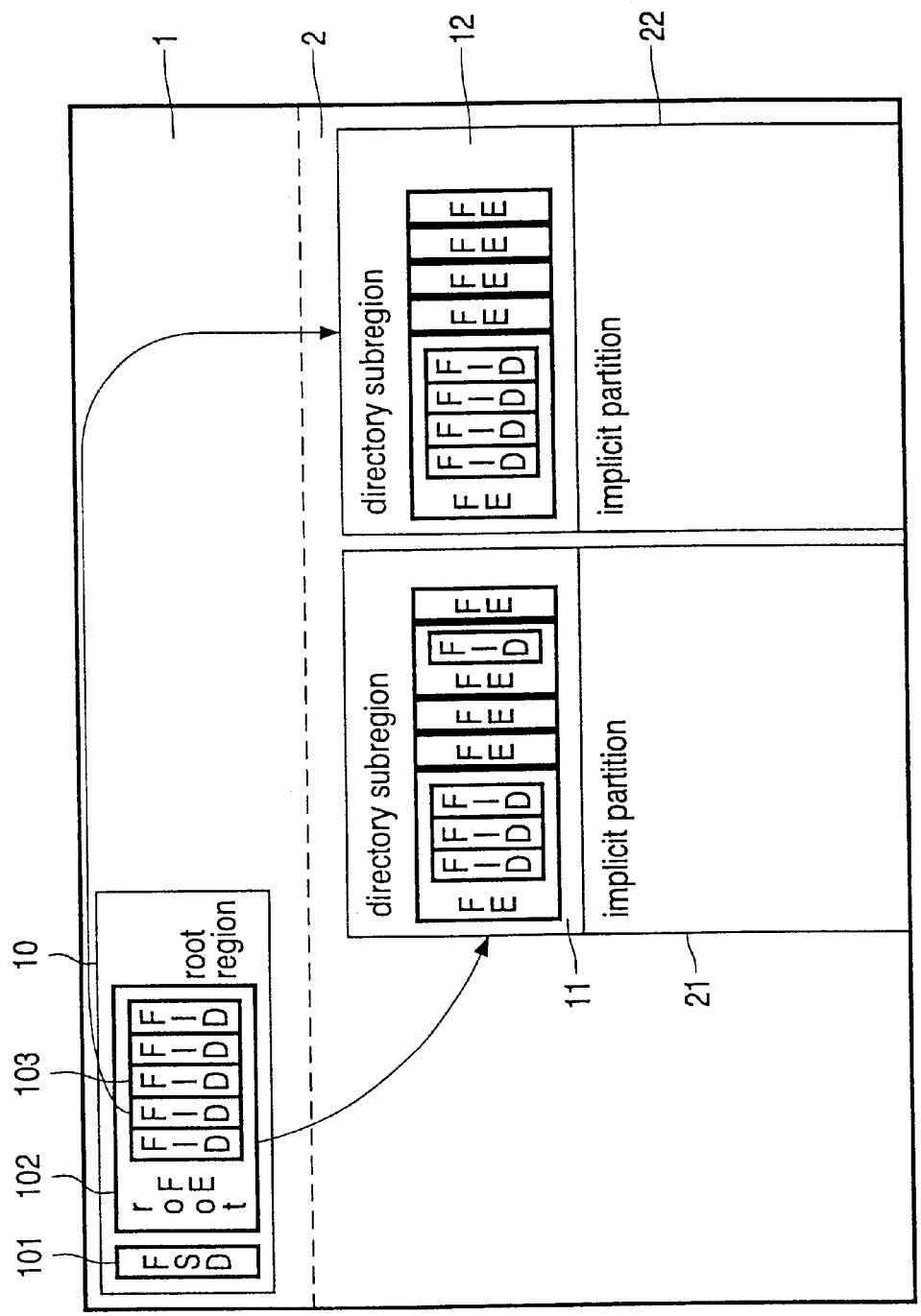
Figure 3:
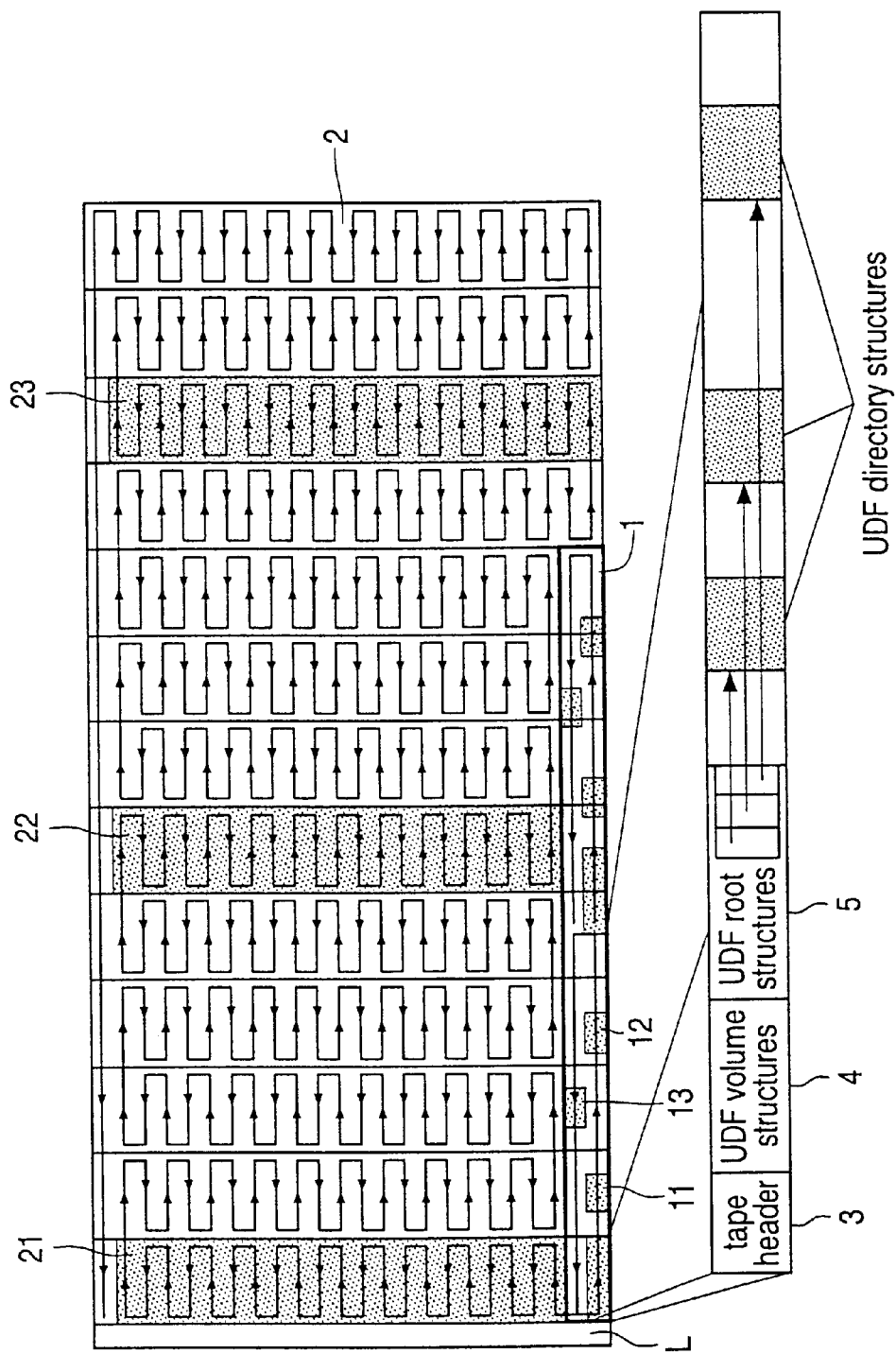
Figure 4A:
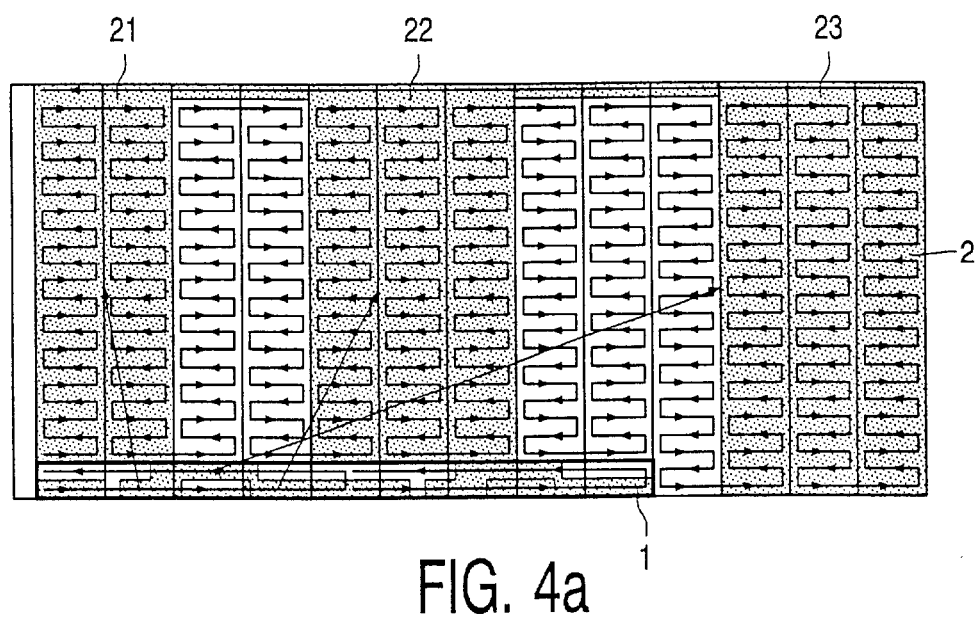
Figure 5A:
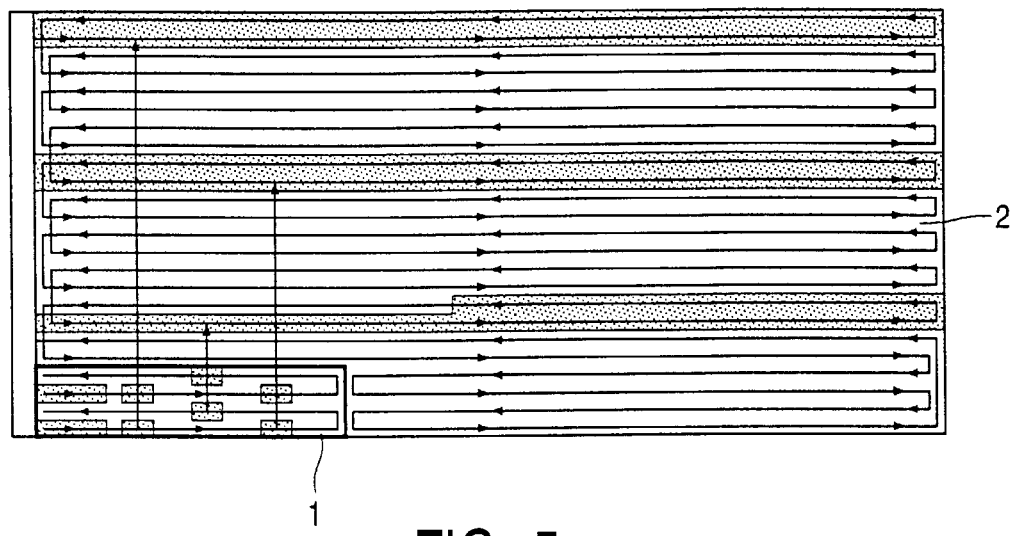
Figure 5B:
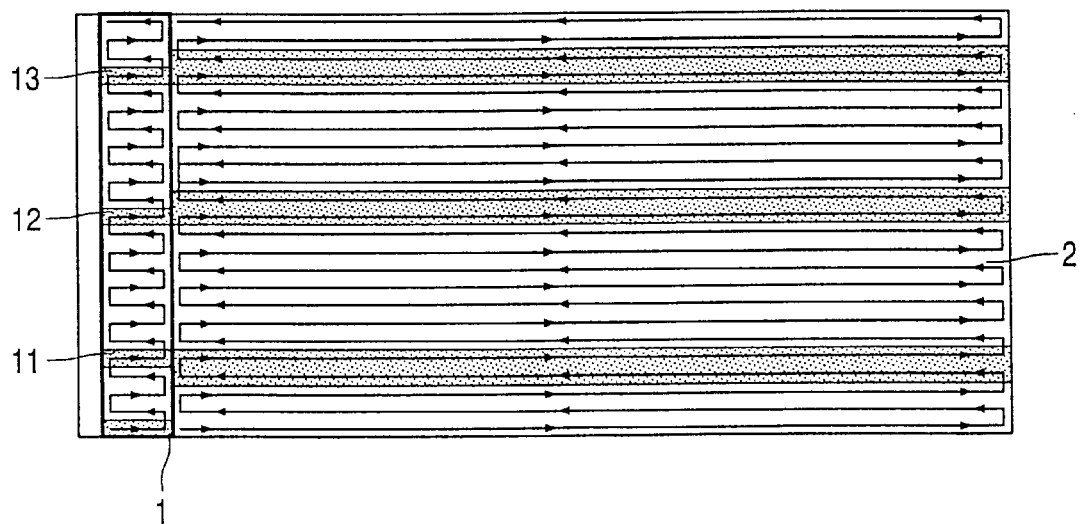
Figure 6:
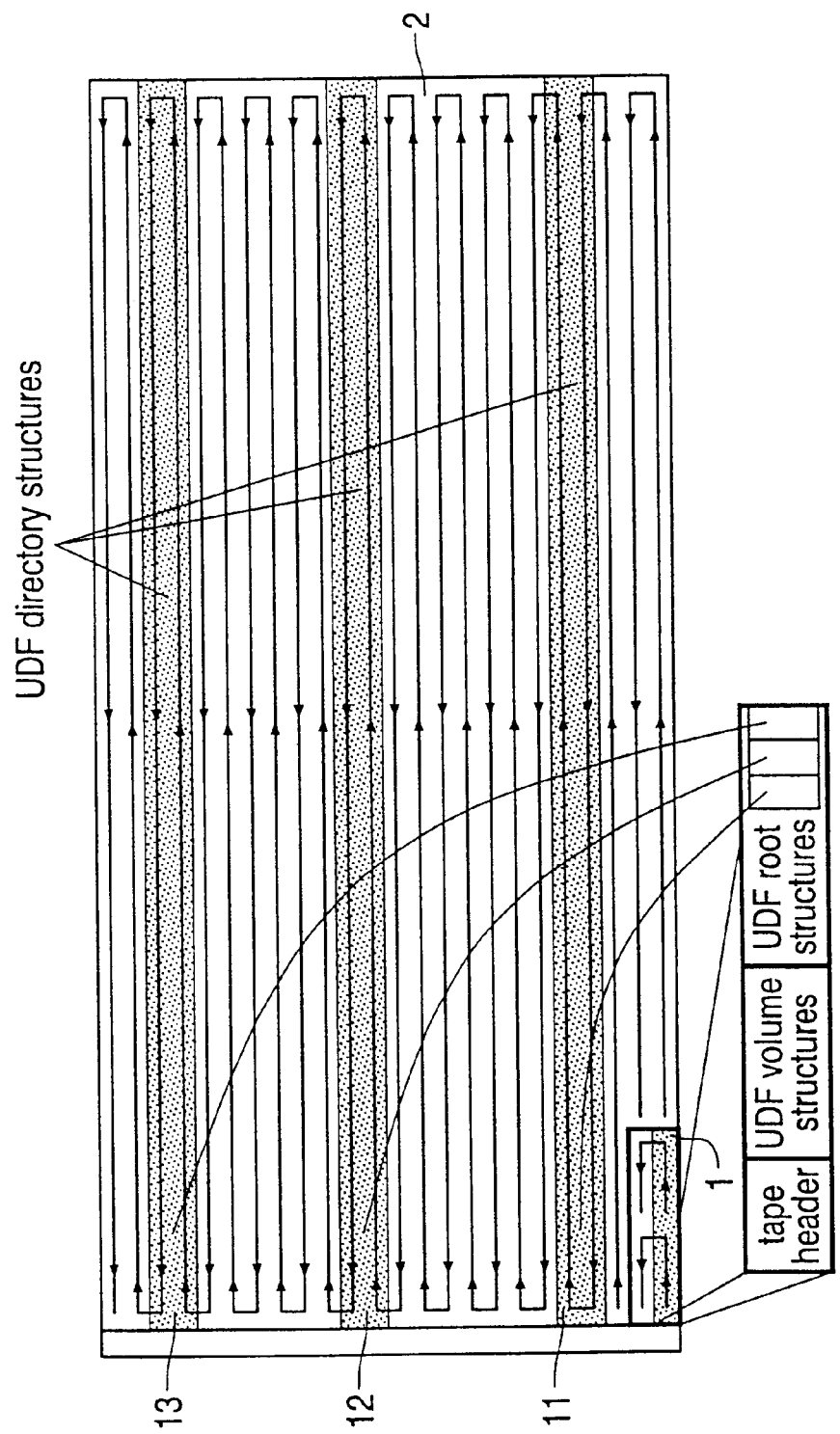
Figure 7:
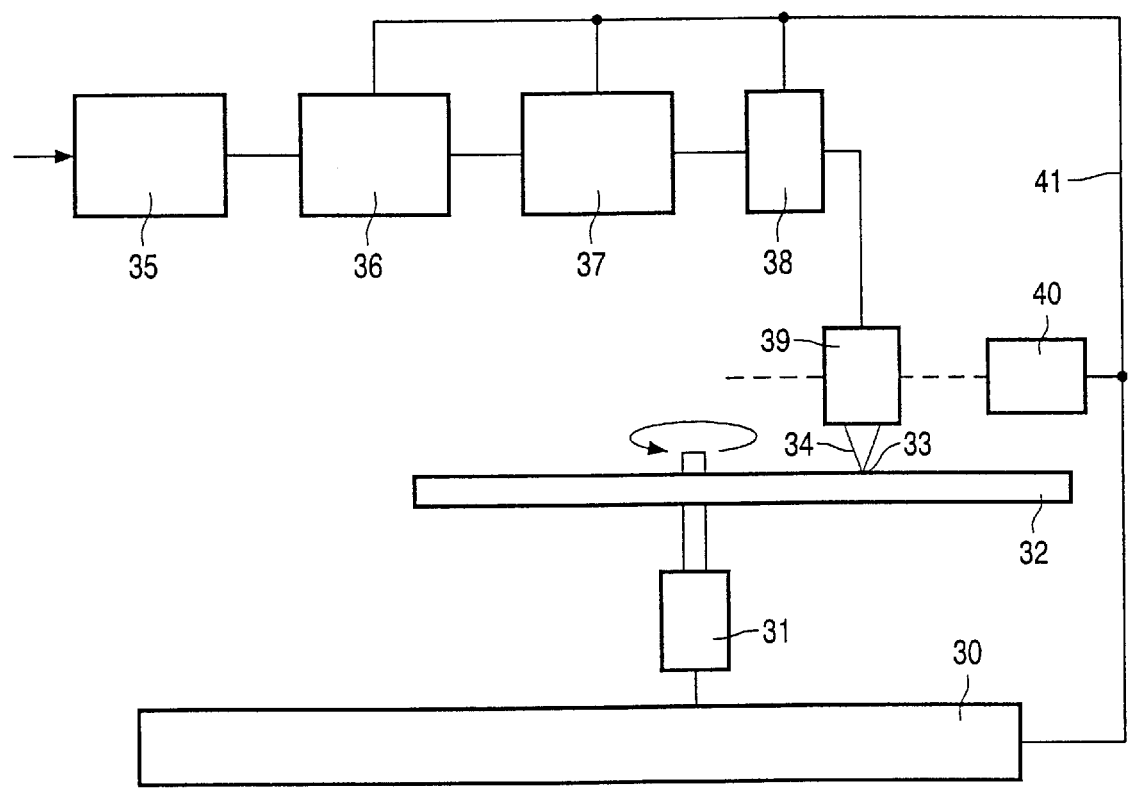

These and further aspects and advantages of the invention will be discussed in more detail hereinafter with reference to preferred embodiments, and in particular with reference to the following figures wherein FIG. 1 shows a first implementation of the invention, FIG. 2 shows a second implementation of the invention, FIG. 3 shows the schematical representation of the implementation of the invention applied to UDF on ADR, FIG. 4 illustrates the flexible nature of the allocation of data according to the invention, FIG. 5 shows examples of the distribution of structures according to the invention optimized for directory caching (a) and access on demand (b), FIG. 6 illustrates the distribution of structures according to the invention with separate directory sub-regions and FIG. 7 shows a block diagram for a recording device according to the invention.

In FIGS. 1 and 2 implicit partitioning according to the invention is illustrated. FIG. 1 illustrates a contiguous directory region 1, in which case there is a separate section of the medium set aside solely for directory information. All the volume level UDF descriptors represented in FIG. 1 by the File Set Descriptor (FSD) 1 are located in the root region 10. Also in the root region 10 is the root File Entry (FE) 102 containing a File Identification Descriptor (FID) 103 for each directory sub-region 11, 12 for each file located in the root directory. The File Entry of files located in a data sub-region 21, 22 both being part of the data region 2 is located in its corresponding directory sub-region 11, 12, which contains all file set data of that data sub-region 21, 22. The directory sub-region 11 contains File Entries 111, 114 which include File Identifyer Descriptors 113, 115, which contain a pointer to File Entries 112 of the directory sub-region 11. These File Entries 112 point to data in the corresponding data sub-region 21, i. e. each File Entry 112 points to a collection of data blocks 212 of the data sub-region 21. In the same way directory sub-region 12 contains File Entries 121 including File Identifyer Descriptors 123 which contain a pointer to other File Entries 122. These File Entries 122 point to a collection of data blocks in the data sub-region 22.

In FIG. 2 implicit partitioning is illustrated in case of a non-contiguous directory region. Compared to FIG. 1 the directory region 1 is fragmented and all directory sub-regions 11, 12 are now located inside data sub-regions 21, 22 in the data region 2.

It is noted that the file set remains fully UDF compliant and therefore accessible to present and future UDF read implementations. Write implementations of UDF need to be aware of the concentration of metadata in the directory space.

One of the proposed measures is clustering the directory information. This clustering enables the rapid recovery of the root directory after which control is given back to the operating system. The remainder of the directory information can be recovered by a background task, immediately if, for instance, the directory information is cached on a hard disk or on demand. This leads to a much reduced perceived mount time. The size of this reduction depends mainly on the size of the root directory and can therefore not be calculated.

Another factor to be considered is the aging of the file system. It should be noted that as long as free space is not scarce the clustering of file data and directory information provides a defence against fragmentation. When free space becomes scarce, the clustering can no longer be enforced and fragmentation of data is inevitable. This can be preempted for the directory region by assigning more space to this region than is needed worst case, thus ensuring that scarcity of free space does not occur in this region.

In FIG. 3 an example is shown of the distribution of structures for an implementation of dynamic implicit partitioning on an ADR tape. To the far left is the landing zone L of the drive head, to remainder is free space. The free space is divided into the data region 2 and the directory region 1 on the bottom left. A detailed view of the directory region 1 is given just below the main graph. The way the tracks are written is indicated by the grey arrows. In the directory region 1 the data is written linearly, with one track turn around, starting and ending in the head landing zone L. In this implementation the directory information is written twice for reasons of robustness. In the data region 2 the data is written in a serpentine fashion, also starting and ending in the landing zone L. Writing in this so called "column mode" ensures that sectors which are close in the logical address space are also near each other in the physical address space. However, this goes at the expense of the sustained data transfer rate. Finally, the grey areas in FIG. 3 indicate occupied space.

The first to be read when mounting a tape, is the beginning of the directory region 1. This part contains the tape header 3, the UDF volume structures 4 and the UDF root structures 5. This part is all that would be present on an empty, UDF formatted tape. This implementation is optimized for the caching of all directory information to a hard disk by writing the directory region linearly on tape, which maximizes the sustained data transfer rate.

Figure 4B:
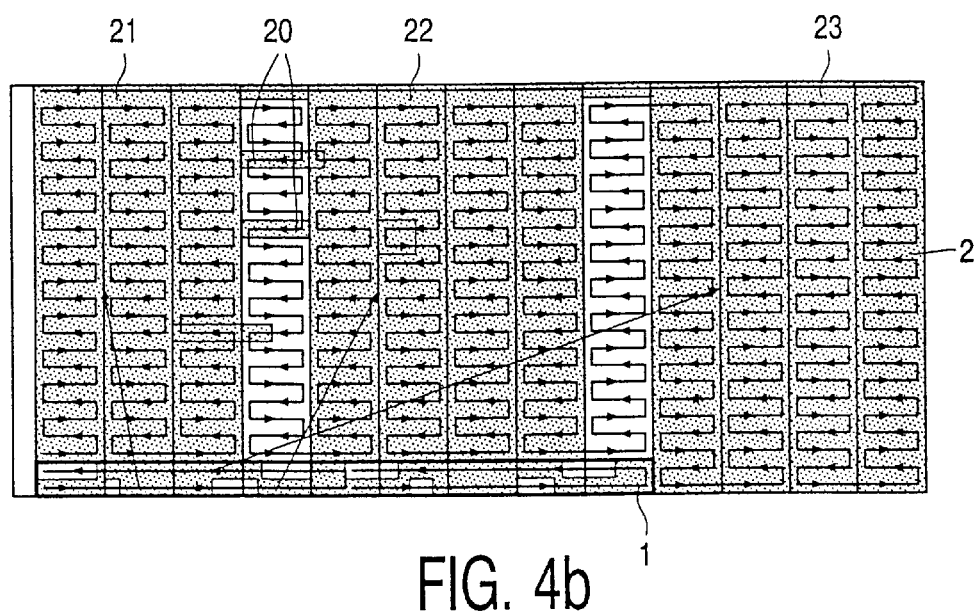

In FIG. 3 some data is already written. There are three implicit partitions (data sub-regions) 21, 22, 23 present, each with their own directory sub-region 11, 12, 13. The connection is indicated by an arrow. What happens if data are added is shown in FIG. 6a. When writing data to each of the three implicit partitions 21, 22, 23 the amount of free space in between these is kept evenly distributed, which means writing sometimes to the left sometimes to the right of the initial starting position of the partition. Furthermore, the directory information of these partitions remains separated. FIG. 4b illustrates what could happen if free space becomes more scarce. Two implicit partitions 21, 22 are sharing a chunk of free space to allocate space 20 near existing files, thus limiting fragmentation.

Some alternative distributions of structures within the dynamic implicit partition scheme are presented in FIGS. 5 and 6. If multiple starting points are required or the data transfer rate has precedence over seek overhead, writing in the serpentine fashion, as depicted in FIGS. 3 and 4, is not appropriate. FIG. 5a depicts a distribution that can be used, for instance, for a set of video streams with cached directory data. The directory data can be read efficiently and there are ten entry points in data space 2 to minimize the time between a start command and the actual beginning of the replay of a stream. FIG. 5b shows a comparable situation which is more appropriate in the case directory information needs to be available from tape on demand. All entry points are located inside the directory region 1 to minimize access time to the directory information.

FIG. 6 gives an example of dynamic implicit partitioning with separate directory sub-regions 11, 12, and 13. Although FIG. 5b and FIG. 6 appear much alike, there is a distinct difference between the two. In FIG. 7b the directory sub-regions 11, 12, 13 are located inside a directory partition 1 for which the sector size can be independently chosen. In FIG. 6 the directory sub-regions 11, 12, 13 are located in the data space 2. It should, however, be noted that many more distributions are possible.

FIG. 7 shows a recording device for writing information on a record carrier 32 according to the invention of a type which is (re)writable. During a writing operation, marks representing the information are formed on the record carrier 32. Writing and reading of information for recording on optical disks and usable rules for formatting, error correcting and channel coding, are well-known, e. g. from the CD or DVD system. Marks may be formed through a spot 33 generated on a recording layer via a beam 24 of electro-magnetic radiation from a laser diode. The recording device comprises further basic elements, i. e. a control unit 30, drive means 31, positioning means 40 and a distinctive write head 39. Information to be stored on a medium, e. g. audio data, video data or any other data, is presented on the input of compression means 35, which may be placed in a separate housing. The compressed data on the output on the compression means 35 is passed to buffer 36 and thereafter to data combining means 37 for adding stuffing data and further control data. A total data stream is thereafter passed to writing means 38 for recording. Write head 39 is coupled to the writing means 38, which comprise for example a formatter, an error encoder and a channel encoder. A data presented to the input of writing means 38 is distributed over logical and physical sectors according to formatting and encoding rules and converted into a write signal for the write head 39. Unit 30 is arranged for controlling buffer 36, data combination means 37 and writing means 38 via control lines 41 and for performing the positioning procedure. The data combination means 37 and the writing means 38 are developed such that data are recorded on the medium 32 in accordance with the invention.

By use of the invention the mount/unmount times of the UDF file set on a medium with a relatively large storage space, e. g. an ADR tape, and/or a relatively large sector size can be brought down to acceptable levels. Some resistance against fragmentation is introduced. Moreover, the proposed measures implement these points while remaining fully UDF compliant.

What is claimed is:

1. Method of implicitly partitioning the storage space available on a storage medium wherein:
   a) storage space available for storage on the medium is divided into a directory region and a data region,
   b) metadata are stored in the directory region,
   c) user data are stored in the data region being implicitly subdivided into data sub-regions,
   d) file set data for user data stored in a data sub-region are stored in a corresponding directory sub-region being assigned to this data sub-region, and
   e) borders and size of data sub-regions are variable.

2. Method as set forth in claim 1, wherein the directory sub-regions are located in the directory region, after a root region provided in the directory region for storing general data.

3. Method as set forth in claim 1, wherein the directory sub-regions are located in the data region, each directory sub-region being located in the corresponding data sub-region.

4. Method as set forth in claim 1, wherein file set data of a directory sub-region are being stored maximally contiguous.

5. Method as set forth in claim 1, wherein the borders and the size of data sub-regions are determined by grouping the file set data for user data of a data sub-region in the assigned directory sub-region.

6. Method as set forth in claim 1, wherein the storage medium is formatted in accordance with the Universal Disk.

7. Method of storing user data on a storage medium being implicitly partitioned in accordance with the method as set forth in claim 1, wherein the user data are stored in the respective data sub-region and wherein the borders of this data sub-region and the space allocated to this data sub-region is varied in dependence on the amount of user data to be stored, the space available in other data sub-regions and/or a certain allocation strategy.

8. Storage medium for storing user data, wherein the storage medium is formatted in accordance with the method as set forth in claim 1.

9. Storage medium as set forth in claim 8, wherein the storage medium is an optical disk, in particular a CD or a DVD, or a fixed disk.

10. Storage medium as set forth in claim 9, wherein the storage medium is formatted in accordance with the Universal Disk Format standard.

11. Recording device for storing user data on a storage medium comprising means implicitly partitioning the storage space available on the storage medium wherein:
    a) storage space available for storage on the medium is divided into a directory region and a data region,
    b) metadata are stored in the directory region,
    c) user data are stored in the data region being implicitly subdivided into data sub-regions.
    d) file set data for user data stored in a data sub-region are stored in a corresponding directory sub-region being assigned to this data sub-region, and
    e) borders and size of data sub-regions are variable.

12. The recording device as set forth in claim 11, wherein the directory sub-regions are located in the directory region, after a root region provided in the directory region for storing general data.

13. The recording device as set forth in claim 11, wherein the directory sub-regions are located in the data region, each directory sub-region being located in the corresponding data sub-region.

14. The recording device as set forth in claim 11, wherein file set data of a directory sub-region are being stored maximally contiguous.

15. The recording device as set forth in claim 11, wherein the borders and the size of data sub-regions are determined by grouping the file set data for user data of a data sub-region in the assigned directory sub-region.

16. The recording device as set forth in claim 11, wherein the storage medium is formatted in accordance with the Universal Disk.

17. The recording device as set forth in claim 11, wherein the user data are stored in the respective data sub-region and wherein the borders of this data sub-region and the space allocated to this data sub-region is varied in dependence on the amount of user data to be stored, the space available in other data sub-regions and/or a certain allocation strategy.

18. The recording device as set forth in claim 11, wherein the storage medium is an optical disk, in particular a CD or a DVD, or a fixed disk.

19. Storage medium as set forth in claim 18, wherein the storage medium is formatted in accordance with the Universal Disk Format standard.

* * * * *